United States Patent [19]
Ferrari et al.

[11] Patent Number: 5,669,108
[45] Date of Patent: Sep. 23, 1997

[54] FASTENING UNIT FOR QUICK FASTENING OF IRON FITTINGS, AND IRON FITTINGS WITH SUCH FASTENING UNIT

[75] Inventors: Franco Ferrari, Frazione Deviscio, 2, 22053 Lecco, Italy; Carlo Migli, Lecco, Italy

[73] Assignee: Franco Ferrari, Lecco, Italy

[21] Appl. No.: 672,970

[22] Filed: Jul. 1, 1996

[30] Foreign Application Priority Data

Jul. 12, 1995 [IT] Italy ................................ MI950496 U

[51] Int. Cl.⁶ ........................................................ E05D 5/00
[52] U.S. Cl. ................................................ 16/383; 411/349
[58] Field of Search ........................ 16/383, 382; 411/349

[56] References Cited

U.S. PATENT DOCUMENTS

| | | | |
|---|---|---|---|
| 3,272,061 | 9/1966 | Seckerson | 411/349 |
| 4,647,262 | 3/1987 | Yokota | 411/349 |
| 5,246,322 | 9/1993 | Salice . | |
| 5,586,364 | 12/1996 | Ferrari et al. | 16/383 |

FOREIGN PATENT DOCUMENTS

| | | |
|---|---|---|
| 2502675 | 10/1982 | France . |
| 2561325 | 9/1985 | France . |
| 2307162 | 11/1996 | France . |
| 2251238 | 5/1974 | Germany . |
| 2358166 | 5/1975 | Germany . |

*Primary Examiner*—M. Rachuba
*Assistant Examiner*—Mark Williams
*Attorney, Agent, or Firm*—Shlesinger Fitzsimmons Shlesinger

[57] ABSTRACT

A unit for fastening iron fittings (43) to furniture parts, comprises an expansion plug (11) which axially receives a pin (12) rotatable between an insertion position and an expansion position of the expansion plug. The pin has a radial protrusion (34) designed to imprison an iron fitting between it and an opposing top end of the expansion plug. The radial protrusion defines a flat surface, substantially perpendicular to the axis of the pin, which extends partially over a coupling seat (35) formed in the opposing top end (14) of the expansion plug around the passage (13) for insertion of the pin in the expansion plug, the bottom (36) of the seat forming a surface facing the flat surface of the radial protrusion, the slot (35) having a side wall (38) facing a corresponding side wall (39) of the pin. The seat (35) can thus receive a substantially complementary portion provided on the iron fitting in correspondence with a hole in the latter for the passage of the pin.

14 Claims, 1 Drawing Sheet

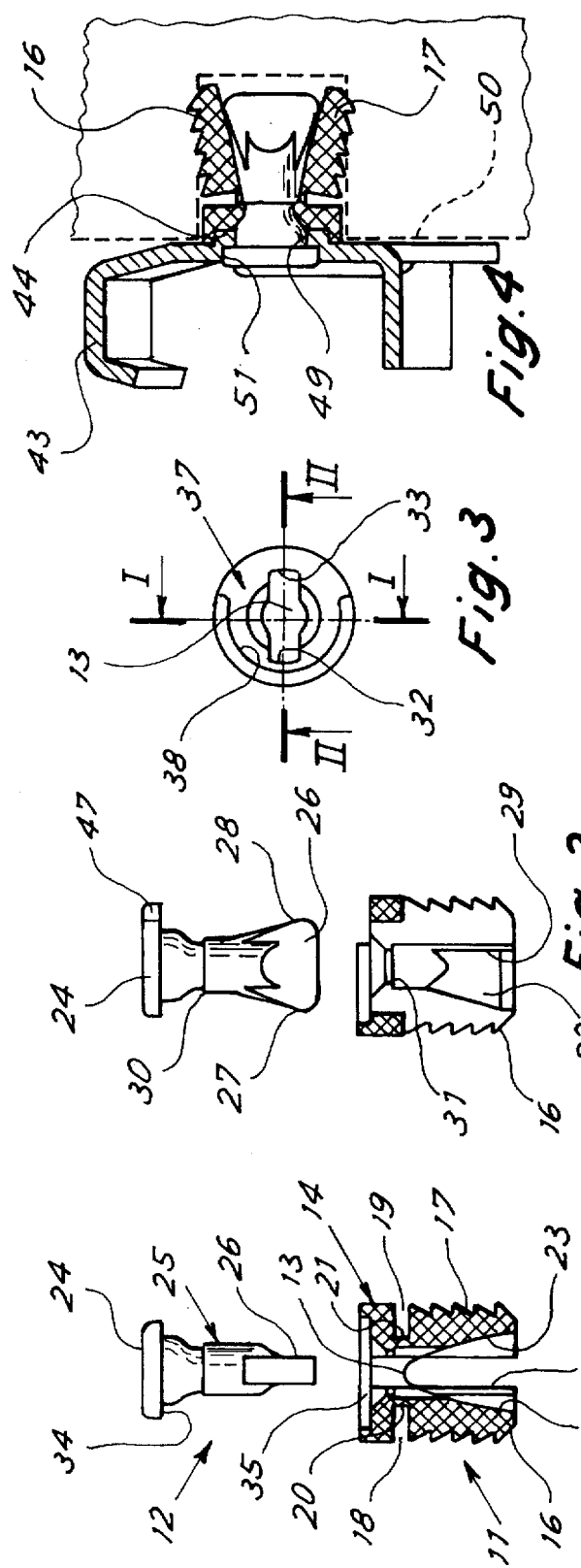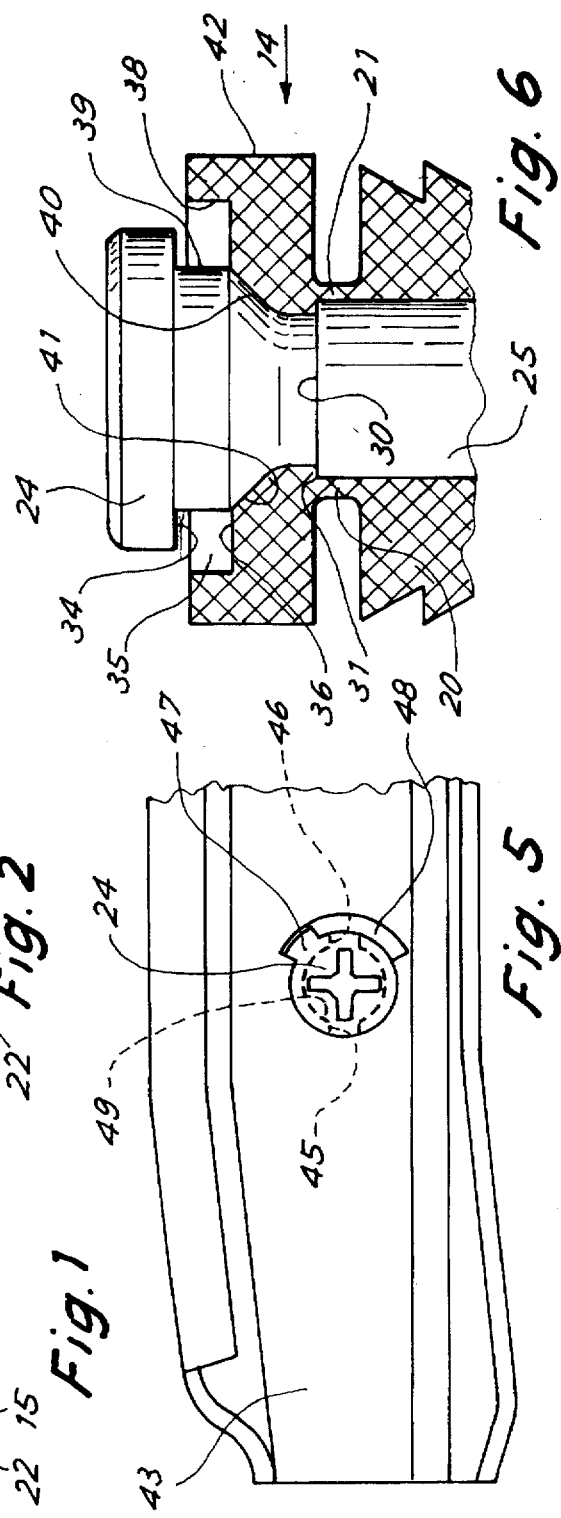

5,669,108

FASTENING UNIT FOR QUICK FASTENING OF IRON FITTINGS, AND IRON FITTINGS WITH SUCH FASTENING UNIT

BACKGROUND OF THE INVENTION

This invention refers to an improved fastening unit for quick fastening of iron fittings, such as runners for drawers or hinges for doors, and to an iron fitting with such fastening unit.

In furniture manufacturing, there is an increasing awareness of the need to be able to fasten the various iron fittings quickly and securely, both in order to speed up the work in the factory, and in order to facilitate the assembly of these elements during installation of the furniture on the user's premises.

SUMMARY OF THE INVENTION

The general scope of this invention is to provide a quick fastening unit, which offers excellent performance in terms of holding capacity, especially to shear stress, and which is inexpensive and easy to use.

A further scope is to provide iron fittings using such fastening unit.

These scopes are achieved, according to the invention, by providing a unit for fastening iron fittings to furniture parts, comprising an expansion plug which axially receives a pin in a passage inside it, the expansion plug being radially expansible by rotation of the pin from an insertion position to an expansion position of the expansion plug, the pin having a control head with a radial protrusion which defines a surface designed to imprison an iron fitting between it and an opposing top end of the expansion plug, characterized by the fact that the radial protrusion defines a flat surface substantially perpendicular to the axis of the pin which extends partially over a coupling seat formed in the opposing top end of the expansion plug around the passage for insertion of the pin in the expansion plug, the bottom of the seat forming a surface facing the flat surface of the radial protrusion, the seat having a side wall facing a corresponding side wall of the pin.

The scope is also achieved by providing an iron fitting having a fastening unit as described above.

BRIEF DESCRIPTION OF THE DRAWINGS

The innovative principles of this invention and its advantages with respect to the known technique will be more clearly evident from the following description of a possible exemplificative and non-restrictive embodiment applying such principles, with reference to the accompanying drawings, in which:

FIG. 1 shows an exploded cross-sectional view along the line I—I of FIG. 3 of a fastening unit according to the invention;

FIG. 2 shows a view similar to that of FIG. 1, viewed along the line II—II of FIG. 3;

FIG. 3 shows a view from a top end of an expansion plug element of the unit of FIG. 1;

FIGS. 4 and 5 respectively show a partial cutaway side view, and a front view of the unit of FIG. 1 assembled on an iron fitting;

FIG. 6 shows an enlarged and partial cutaway view of a detail of the assembled fastening unit.

DETAILED DESCRIPTION OF THE INVENTION

With reference to the figures, FIG. 1 shows a quick fastening unit composed of an expansion plug element 11 and by a cam or pin element 12.

The expansion plug 11, made of plastic material, has an axial housing or passage 13 to receive the pin 12 inserted into the top part or end 14 of the plug. The top 14 of the expansion plug has a substantially cylindrical lateral surface 42.

To the rear of the top end 14 the expansion plug has a diametrical incision 15 which divides the expansion plug into two halves or expansible fingers 16, 17, each having an external surface with arrowlike ribs towards the rear of the expansion plug. The two halves 16, 17 can be elastically spread apart from each other by flexure of the area of connection between them and the head 14 of the expansion plug.

Advantageously, provided between fingers 16, 17 and head 14 are respective diametrical reliefs 18, 19 to create flexural areas 20, 21 with a limited thickness and diameter, to permit easy flexure of the fingers without transmitting excessive deformation from the fingers to the head.

After a first cylindrical section, the housing 13 widens out and moves away from the head so that on each finger 16, 17 a substantially conical surface 22, 23 is formed. The pin 12 has an enlarged operating head 24 which axially extends to form the body 25, identifying at the other end (as can be clearly seen in FIG. 2) a flattened widened arrow-like area 26 which defines cam surfaces 27, 28, designed to slide over conical surfaces 22, 23 upon rotation of the pin in the housing.

As can be clearly seen in FIG. 1, the width of the diametrical incision 15 between the fingers of the expansion plug is greater than the thickness of the flattened area 26 of the pin, so as to enable the pin to be inserted into the expansion plug when they are disposed as shown in FIGS. 1 and 2. Moreover, what is considered the top portion of the housing 13 has radial protrusions 32, 33 (FIG. 3) for passage of the ends of the flattened portion 26.

By axially rotating the pin by 90°, from the insertion position of FIG. 1 to the expansion position of FIG. 4, the surfaces 27, 28 slide over the surfaces 22, 23, causing expansion of the expansion plug as shown in FIG. 4.

After having reached the expansion position, further rotation of the pin is prevented by a stop element 29 disposed at the lateral end of at least one of the surfaces 22, 23 (FIG. 2).

Advantageously, the body of the pin 12 is provided with a diametrical step 30 which engages under a corresponding protrusion 31 inside the housing 13 to ensure a snap coupling between the expansion plug and pin when the latter is completely inserted into the housing. In other words, once the pin and expansion plug have been fitted together, the pin can rotate freely between the insertion position and the expansion position, but can no longer be removed from the housing 13 due to the coupling between the steps 30 and 31.

FIG. 6 shows in detail the top portion of the fastening unit formed by the expansion plug and pin.

The head 24 of the pin has a radial protrusion which defines a flat surface or edge 34 perpendicular to the axis of the pin and facing the expansion plug. The edge 34 extends partially over a seat 35 made in the head 14 of the expansion plug and whose bottom 36 (substantially radial to the axis of the expansion plug) is disposed facing the edge 34. The seat 35 has a side wall 38 which is faced by a corresponding cylindrical side wall 39 of the pin from which the edge 34 protrudes substantially at right angles. Beneath the surface determined by the bottom 36 the housing 13 has a tapered shape which forms a slanted surface 40 on which rests a corresponding conical slanted surface 41 for centering the pin 12.

The seat 35 and the head of the pin constitute a restraint for the iron fittings to be fastened.

FIGS. 4 and 5 show the assembly composed of the fastening unit and an iron fitting, generically indicated by reference 43. In the figures, the iron fitting is represented in the form of a rail of a runner for drawers.

It is clear however that other iron fittings, such as for example hinges, can be used according to the invention. The iron fitting 43, for example made of thin sheet metal, has a recessed area which forms an edge 44 of the hole which is substantially complementary to the seat 35 defined between the internal side wall 38 of the expansion plug and the cylindrical side wall 39 of the pin.

As can be clearly seen in FIG. 4, the external diameter of the recessed area 44 is such as to fit with interference against the wall 38 of the seat 35.

The recessed area 44 forms a hollow or depression 51 which receives the head 24 of the pin so that it remains substantially embedded in the thickness of the rail 43, so as not to hinder the sliding of the runner (the remainder of which is known and consequently not shown in detail). The hole 49 for passage of the pin through the iron fitting has a slightly larger diameter than the diameter of the pin in correspondence with the cylindrical wall 39 so that the pin can rotate in the expansion plug without hindrance. Moreover, the thickness of the recessed area 44 is substantially identical to the distance between the opposing surfaces 34 and 36.

As can be seen by the broken line in FIG. 5, the hole for the passage of the pin through the iron fitting has two diametrical extensions 45, 46 for the passage of the lateral ends of the arrowlike flattened area 26 of the pin 12.

Advantageously, the head 24 of the pin 12 has a radial protrusion 47 which slides in a complementary channel or radial extension 48 of the recessed hollow. The extension 48 and radial protrusion 47 constitute a limit stop for rotation of the pin between the insertion position and expansion position of the expansion plug as well as a reference to visibly indicate which of the two positions the pin is in.

Whenever the protrusion 47 and the extension 48 are present, the lateral portion 38 of the seat 35 is correspondingly interrupted by means of an opening along the circumference.

To use, the expansion plug is fitted onto the protruding portion of the recessed area, so that the latter is received with interference in the seat 35. The pin is then pushed through the hole 49 in the housing 13 until the step 30 of the pin engages with the step 31 of the expansion plug.

At this point the fastening unit is firmly secured to the iron fitting.

To secure the iron fitting to a piece of furniture, simply insert the expansion plug into a suitably sized hole made in the surface of the piece of furniture (represented by the broken line indicated by reference 50 in FIG. 4) and rotate the head of the pin by means of an appropriate tool (depending upon the type of known coupling-provided on the head 24) towards the expansion position).

Because of the innovative conformation of the head of the fastening unit a firm fastening can be achieved between the piece of furniture and iron fitting. In fact, the surface 34 of the pin applies a pure axial force to pull the iron fitting towards the furniture (the sliding action of the surfaces 27, 28 of the pin over the surfaces 22, 23 of the expansion plug producing a tractive force on the pin in the expansion plug).

Moreover, the surface 42 of the expansion plug adheres to the walls of the hole in the piece of furniture while the surface 38 adheres to the lateral surface of the recessed area, so as to provide a firm grip against the shearing stress exerted upon the iron fitting. In this way clearance between the iron fitting and the furniture is avoided, without however transmitting the shearing stress to the pin, which would otherwise become difficult to operate and subject to rupture. The combination of the surface 34, which provides axial traction, with the lateral surfaces of the expansion plug, which provide lateral restraint without clearance, results in a high holding capacity, while at the same time maintaining clearance between the cylindrical surface 39 of the pin and hole 49 in the recessed area to prevent jamming during rotation of the pin due to manufacturing tolerances. The contact between the conical surface 41 and the corresponding housing in the expansion plug enables the pin to be easily centred in the expansion plug.

Lastly, the conformation of the head of the expansion plug prevents transmission of deformation forces between the head and expansion fingers, said forces being capable of jeopardizing the holding capacity of the fastening unit.

At this point it will be clear that the intended scopes have been achieved by providing a fastening unit and an iron fitting with such unit, which permit quick and easy assembly together with a highly reliable holding capacity.

The foregoing description of an embodiment applying the innovative principles of this invention is obviously given by way of example in order to illustrate such innovative principles and should not therefore be understood as a limitation to the sphere of the invention claimed herein.

For example, it will be obvious to the expert in the field that the iron fitting may differ from the one shown as an example.

Moreover, the proportions of the various elements of the fastening unit may vary according to practical requirements.

What is claimed is:

1. Unit for fastening iron fittings to furniture parts, comprising an expansion plug which axially receives a pin in a passage therein, the expansion plug being radially expansible by rotation of the pin from an insertion position to an expansion position of the expansion plug, the pin having a control head with a radial protrusion which defines a surface designed to imprison an iron fitting between it and an opposing top end of the expansion plug, characterized by the fact that the radial protrusion defines a flat surface substantially perpendicular to the axis of the pin which extends partially over a coupling seat formed in the opposing top end or the expansion plus around the passage for insertion of the pin in the expansion plug, a bottom of the deal forming a surface facing the flat surface of the radial protrusion, the seat having a side wall facing a corresponding side wall of the pin, and wherein the pin has a step extending radially which snap fits under a complimentary protrusion in the passage in the expansion plug.

2. Fastening unit as claimed in claim 1, characterized by the fact that said top end of the expansion plug has an external side wall which extends in an axial direction to the expansion plug over a greater extension than the side wall of said seat.

3. Fastening unit as claimed in claim 1, characterized by the fact that, beneath the surface formed by the bottom of the seat, the passage has a conformation which narrows radially to form a slanting surface designed to receive a corresponding slanting surface of the pin.

4. Fastening unit as claimed in claim 1, characterized by the fact that the expansion plug expands radially in correspondence with expansion fingers connected to the top end of the expansion plug through areas of the expansion plug having a limited thickness.

5. Fastening unit as claimed in claim 1, characterized by the fact that the expansion plug comprises radial expansion fingers which have slanted cam surfaces facing into the passage of the expansion plug, the pin having corresponding slanted cam surfaces protruding radially from it which slide over the slanted cam surfaces of the fingers and bend the expansion fingers outward upon rotation of the pin from the insertion position to the expansion position.

6. Fastening unit as claimed in claim 5, characterized by the fact that the slanted cam surfaces on the expansion plug and the corresponding slanted surfaces on the pin are slanted to diverge in a direction outward from the longitudinal axis of the expansion plug.

7. Fastening unit as claimed in claim 5, characterized by the fact that at least one slanted cam surface on the expansion plug has a stop projection to stop the rotation of the pin upon reaching the expansion position.

8. Fastening unit as claimed in claim 5, characterized by the fact that said corresponding slanted cam surfaces of the pin are surfaces of the edge of a flattened widened area of the pin.

9. Iron fitting for furniture, comprising a unit for fastening to furniture parts, the fastening unit being made according to claim 1.

10. Iron fitting as claimed in claim 9, characterized by the fact of comprising a hole for the passage of the pin surrounded by an edge protruding towards the expansion plug, the edge being inserted with lateral interference into the seat in the expansion plug.

11. Iron fitting as claimed in claim 10, characterized by the fact that the protruding edge has an internal wall which forms at least part of the hole and which receives with clearance said side wall of the pin.

12. Iron fitting as claimed in claim 10, characterized by the fact that the hole for passage of the pin is surrounded by a depressed portion which at least partially receives the control head of the pin.

13. Iron fitting as claimed in claim 12, characterized by the fact that the depressed portion has a radially widened area on which slides a radial protrusion of the head of the pin which constitutes a stop for rotation of the pin and identifies the position of insertion and the position of maximum expansion.

14. Iron fitting as claimed in claims 12, characterized by the fact that the protruding edge and the depressed portion are made as the same recessed portion in the thickness of the iron fitting in correspondence with the hole in it for the passage of the pin.

* * * * *